United States Patent [19]
Arima et al.

[11] Patent Number: 5,955,848
[45] Date of Patent: Sep. 21, 1999

[54] HORIZONTAL DEFLECTION S-SHAPED CORRECTION SIGNAL CIRCUIT WITH VARIABLE CAPACITANCE

[75] Inventors: Kenji Arima; Takeo Takemura, both of Tokyo, Japan

[73] Assignee: LG Electronics Inc., Rep. of Korea

[21] Appl. No.: 08/975,597

[22] Filed: Nov. 21, 1997

[51] Int. Cl.$^6$ .................................................. H04N 3/233
[52] U.S. Cl. ........................................... 315/371; 315/408
[58] Field of Search .................................... 315/370, 371, 315/408, 411; 348/806

[56] References Cited

U.S. PATENT DOCUMENTS

| | | | |
|---|---|---|---|
| 4,501,995 | 2/1985 | Olmstead et al. | 315/371 |
| 4,533,855 | 8/1985 | Willis et al. | 315/370 |
| 4,645,985 | 2/1987 | Dietz | 315/371 |
| 4,673,984 | 6/1987 | Kikuchi et al. | 348/730 |
| 4,709,193 | 11/1987 | Dietz | 315/408 |
| 5,155,417 | 10/1992 | Tateishi | 315/371 |
| 5,283,505 | 2/1994 | Bando | 315/411 |
| 5,530,488 | 6/1996 | Rilly et al. | |
| 5,666,033 | 9/1997 | Vintrois | 315/408 |
| 5,703,444 | 12/1997 | Teuling et al. | 315/371 |

FOREIGN PATENT DOCUMENTS

| | | |
|---|---|---|
| 0146345 | 12/1984 | European Pat. Off. . |
| 5-328162 | 12/1993 | Japan . |

Primary Examiner—Edward P. Westin
Assistant Examiner—Shane R. Gardner

[57] ABSTRACT

A horizontal S-shaped correction signal circuit having a correction condenser disposed in a cathode ray tube (CRT) horizontal deflection circuit such as in a television receiver, a display monitor, etc. In particular, a horizontal S-shaped correction signal circuit which is capable of obtaining an accurate correction effect and a desired adjustment. The total capacitance of the correction condenser $C_S$ for a horizontal deflection circuit is variable by selectively connecting in parallel therewith correction condensers $C_{S1}$ and $C_{S2}$ by switches $SW_1$ and $SW_2$ during the scanning interval. Therefore, the correction characteristic is improved. Namely, it is possible to obtain a highly accurate S-shaped correction signal. In addition, it is possible to independently control the width of the front portion and rear portion of the horizontal scanning interval by controlling externally inputted direct control current signals DA-$C_{TL1}$ and DA-$C_{TL2}$. Furthermore, it is possible to vary the S-shaped correction signal width depending on the vertical scan position on the screen.

2 Claims, 7 Drawing Sheets

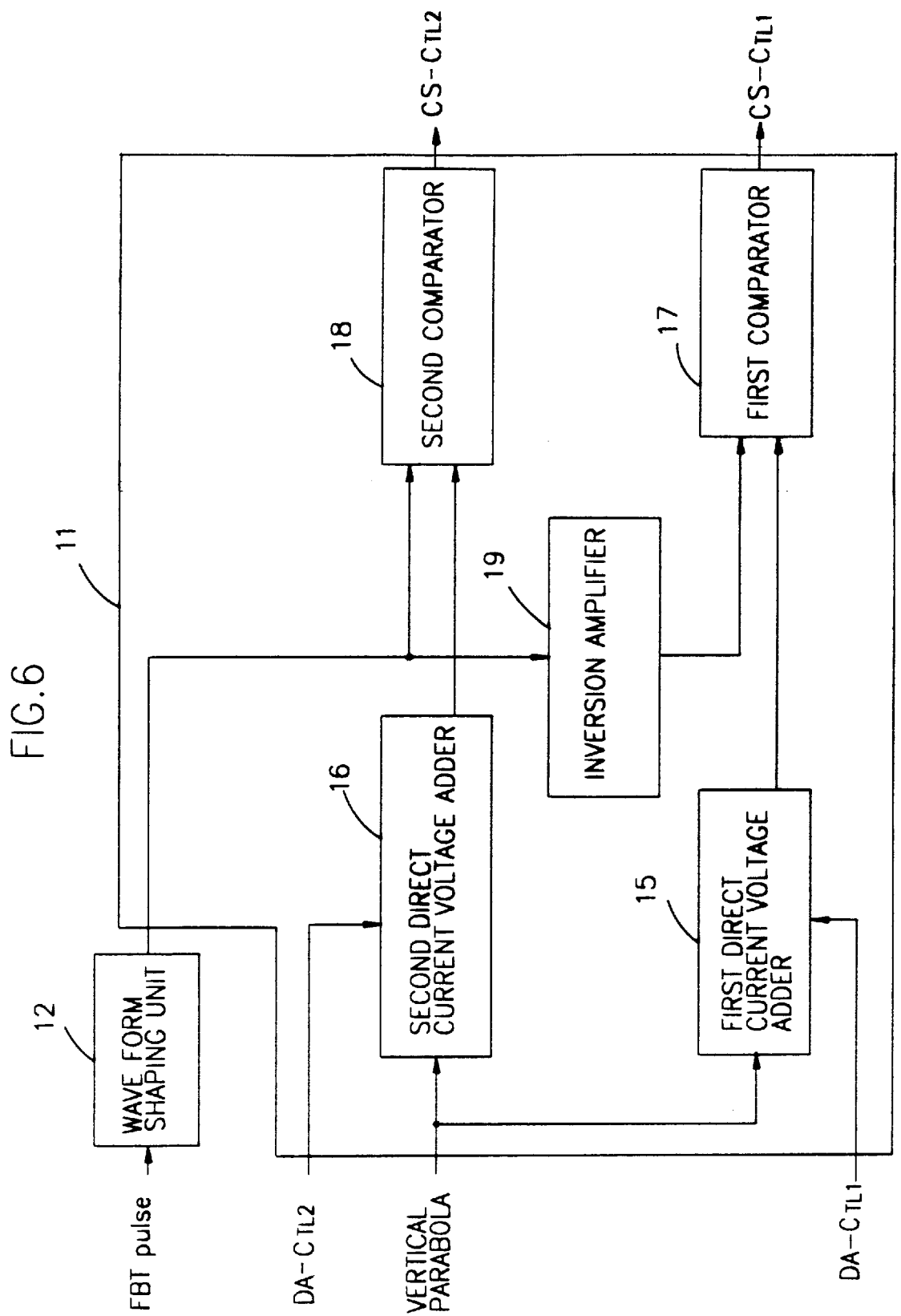

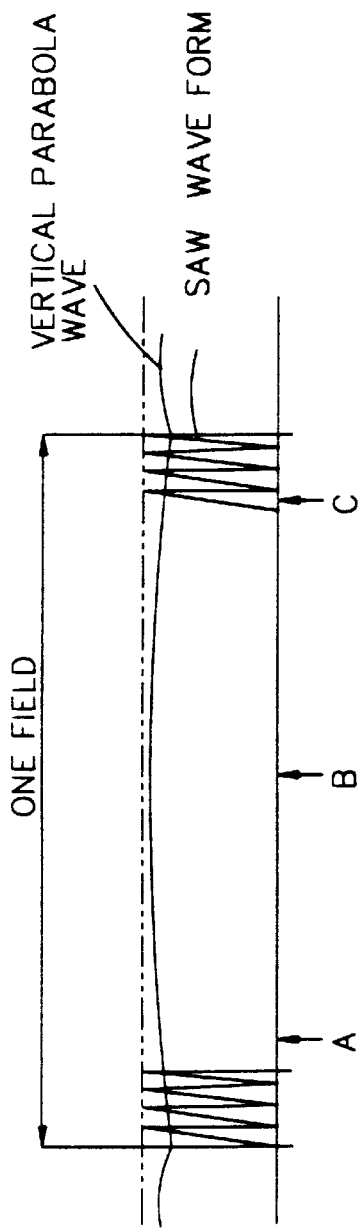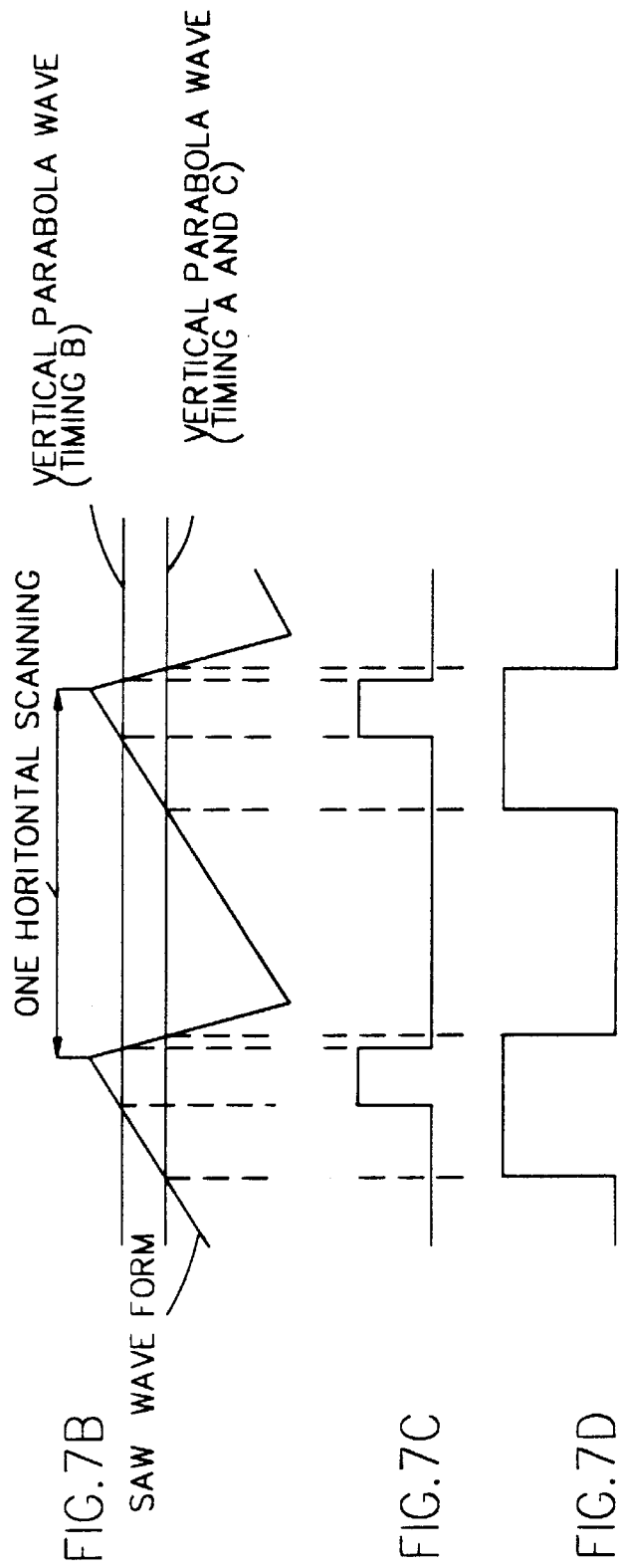

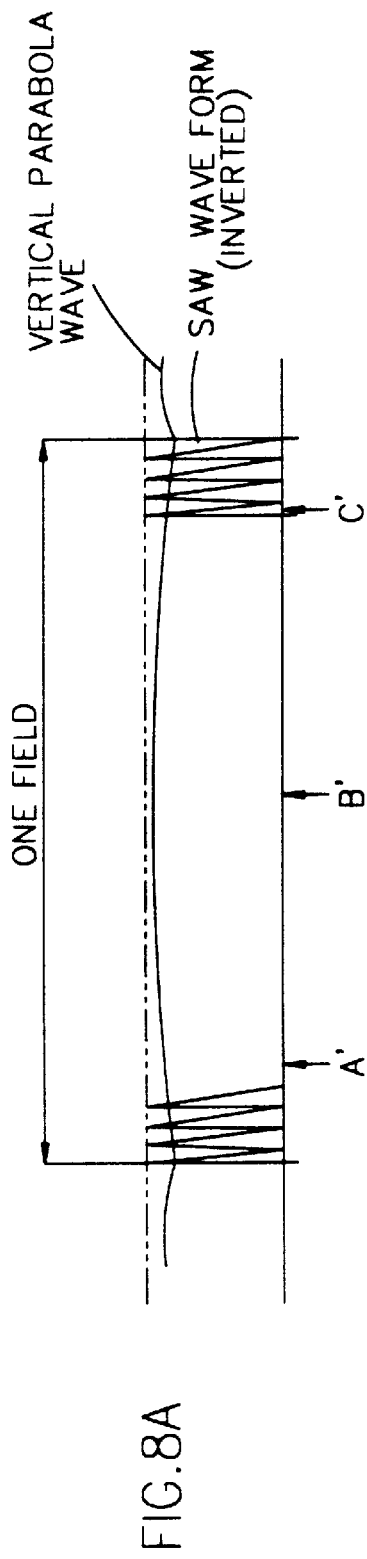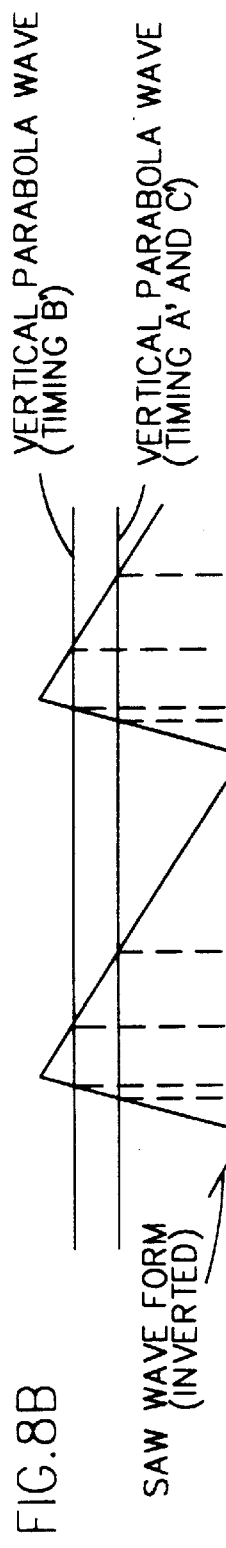
FIG.8A
FIG.8B
FIG.8C
FIG.8D

HORIZONTAL DEFLECTION S-SHAPED CORRECTION SIGNAL CIRCUIT WITH VARIABLE CAPACITANCE

BACKGROUND OF THE INVENTION

1. Field of the Invention

The present invention relates to an S-shaped correction signal circuit having an S-shaped correction signal condenser, the capacitance of which is controllable, installed in a horizontal deflection circuit, and in particular to an S-shaped correction signal circuit having an S-shaped correction signal condenser the capacitance of which is controllable within a horizontal scan period interval.

2. Description of the Conventional Art

FIG. 1 illustrates a conventional horizontal deflection circuit. In the drawing, HD denotes a horizontal driving signal generator, $T_R$ denotes a horizontal output transistor, D denotes a damper diode, $C_r$ denotes an oscillation condenser, $L_{DY}$ denotes a horizontal deflection coil, $C_S$ denotes an S-shaped correction signal condenser, FBT denotes a flyback transformer, and +B denotes a horizontal deflection circuit voltage. Since the operation of the horizontal deflection circuit is well known in the industry, the description on the operation thereof will be omitted. Therefore, only the S-shaped correction signal condenser $C_S$ will be explained.

First, as shown by the solid line in FIG. 2A, the deflection current which flows at a deflection yoke ideally has a straight line characteristic. Actually, the deflection current has a non-straight line characteristic due to a resistance loss of the damper diode D, the On resistance loss of the horizontal output transistor $T_R$, and an effective resistance value of the deflection yoke, etc., as shown in the drawing as a broken line.

The horizontal screen size (scan length) is increased in the front half portion of the scan deflection, and the same is gradually decreased in the rear half portion of the scan due to the above-described characteristics.

Therefore, scan lines on the left side of the screen are horizontally extended, and scan lines on the right side of the screen are horizontally shortened, namely, a screen distortion phenomenon occurs on both the sides of the screen.

Furthermore, since a Braun tube has a non-spherical surface, a non-straight line characteristic exists therein. Therefore, the width of a displayed image is decreased in the center portion of the screen, and the same is extended at the edge portions of the screen, namely, a distortion is formed in the screen image.

In order to correct the above-described distortion problem, an S-shaped correction signal condenser $C_S$ is provided, which causes the horizontal deflection signal to the oscillate in accordance with the inductance and capacitance values of the horizontal deflection circuit shown in FIG. 1, and the condenser $C_S$ forms a series LC circuit with the horizontal deflection coil $L_{DY}$, so that an S-shaped correction (compensation) of the horizontal deflection signal is implemented. The correction is performed depending on the degree of distortion. For example, if an oscillation is performed at a frequency twice the horizontal sync. frequency, the correction current becomes an oscillation current as shown in FIG. 2B.

Therefore, it is possible to obtain a horizontal deflection current characteristic, as shown in FIG. 2C, by the correction current. Namely, in the front and end portions in the horizontal deflection current scanning interval, the current slant is decreased, and the amplitude in the horizontal direction is narrow, and in the center portion of the scanning interval, the current slant is increased, and the horizontal direction amplitude is widened.

Therefore, it is possible to decrease the distortion of the image which occurs due to the non-straight line characteristic of the deflection current and the non-spherical surface of the Braun tube.

In the above-described conventional S-shaped correction signal circuit, since the capacitance of the correction condenser $C_S$ is fixed, it is difficult to obtain a desired correction effect of a high accuracy, and in addition, it is difficult to control the capacitance of the correction condenser.

SUMMARY OF THE INVENTION

Accordingly, it is an object of the present invention to provide a horizontal deflection S-shaped correction signal circuit which overcomes the aforementioned problems encountered in the conventional art.

It is another object of the present invention to provide an improved horizontal deflection S-shaped correction signal circuit which is capable of obtaining a highly accurate correction effect by selectively connecting correction condensers to a horizontal deflection circuit for more easily controlling the total capacitance of the correction condenser.

To achieve the above objects, there is provided a horizontal deflection S-shaped correction signal circuit according to the present invention which includes a correction condenser a capacitance of which is variable, and a controller for controlling the total capacitance of the correction condenser in a horizontal scanning period by switching the switches in order to correct for a horizontal image distortion problem.

To achieve the above objects, there is also provided a horizontal S-shaped correction circuit according to the present invention which includes front and rear portion correction condensers parallely connected with a main correction condenser, a first switch for switchably connecting the front portion correction condenser to the main correction condenser, a second switch for switchably connecting the rear portion correction condenser to the main correction condenser, and a controller for controlling the first and second switches to vary a total capacitance of the correction circuit by turning on the first switch in a front portion interval of a horizontal scanning period and by turning on the second switch in a rear portion interval of the horizontal scanning period, for thus correcting a horizontal image distortion.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a block diagram illustrating the construction of a timing pulse generator of the circuit of FIG. 3;

FIGS. 7A through 7D are wave form diagrams of signals in the circuit of FIG. 6;

FIGS. 8A through 8D are wave form diagrams of signals of the circuit of FIG. 6.

DETAILED DESCRIPTION OF THE INVENTION

In the circuit according to the present invention, the S-shaped correction signal condenser causes the horizontal deflection scanning signal to oscillate in accordance with an inductance value of the horizontal deflection circuit like in the conventional S-shaped correction signal circuit. Therefore, the horizontal deflection current has an S-shaped characteristic, so that distortion of a screen image is decreased.

In addition, in the present invention, it is possible to control the characteristic of the S-shaped correction signal by changing the capacitance of the correction condenser during a horizontal deflection scanning period. Therefore, it is possible to enable a higher precision correction.

Furthermore, the capacitance of the correction condenser is implemented for independently controlling the correction signal during the front and rear portions of one horizontal scan period. In addition, it is possible to vary the interval of the scanning time by varying the capacitance. Therefore, an S-shaped correction of the deflection signal is implemented for balancing the front and rear portions of the horizontal scanning signal.

The non-spherical distortion which occurs during the horizontal scanning of the cathode ray tube is different in accordance with the position of the scanning beam in the vertical direction of the cathode ray tube. Finally, the range of the non-spherical distortion which occurs in the left and right end portions of the horizontal scan is made wider toward the upper and lower edges of the cathode ray tube and is made narrower toward the center portion thereof.

In the present invention, it is possible to decrease the distortion of the screen image which occurs due to the non-spherical distortion of the cathode ray tube by varying the interval of the time of the horizontal scanning period control at every vertical line position.

Figure 1:
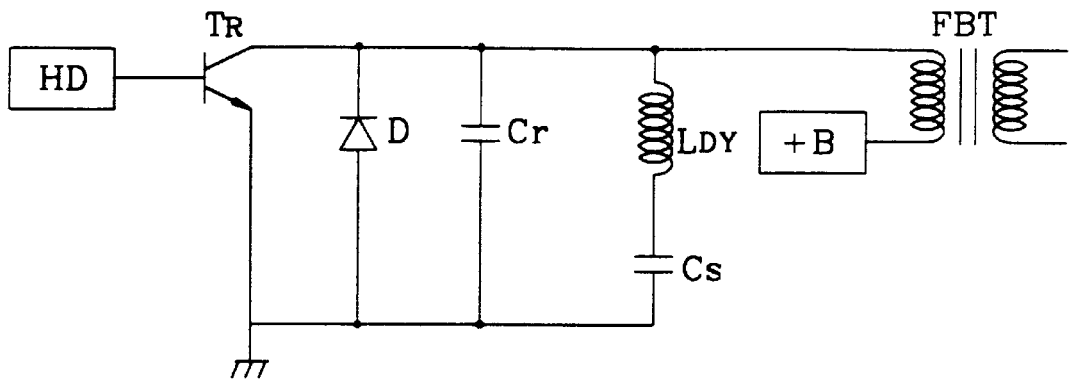
FIG. 1 is a schematic circuit diagram illustrating a conventional horizontal deflection circuit.
Figure 2A:
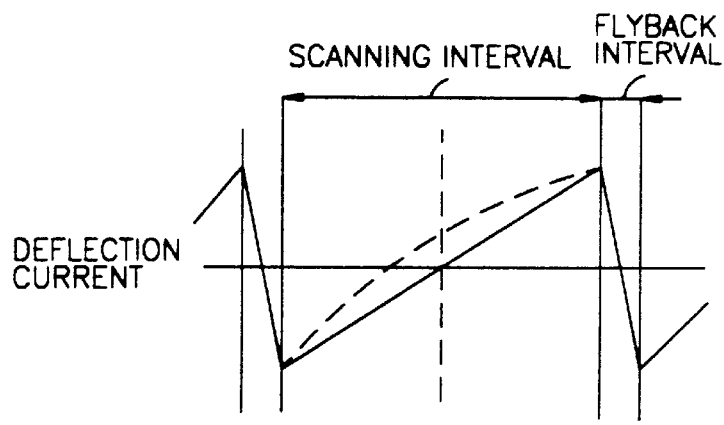
FIGS. 2A through 2C are wave form diagrams illustrating S-shaped correction characteristics of the circuit of FIG. 1.
Figure 2B:
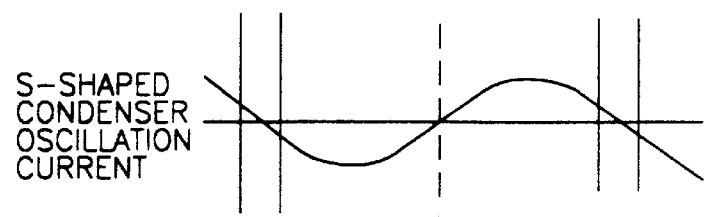
Figure 2C:
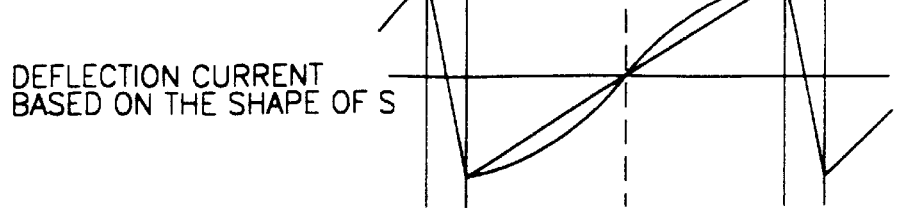
Figure 3:
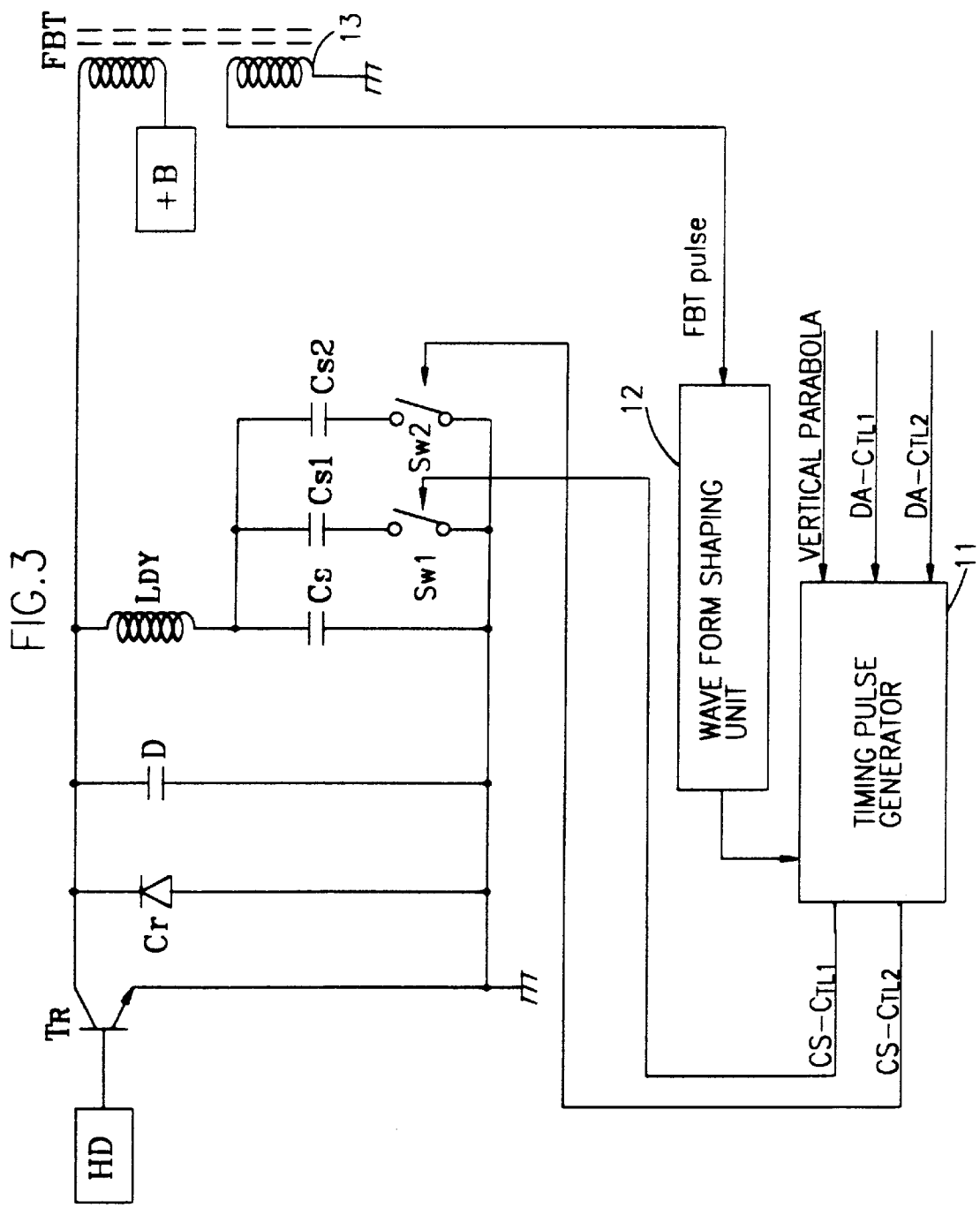
FIG. 3 is a schematic circuit diagram illustrating a horizontal deflection circuit to which a horizontal deflection S-shaped correction signal circuit according to the present invention is adapted.

FIG. 3 illustrates a horizontal deflection circuit adapting a horizontal S-shaped correction signal circuit according to the present invention. In the drawing, HD denotes a horizontal driving signal generator, $T_R$ denotes a horizontal output transistor, D denotes a damper diode, $C_r$ denotes an oscillation condenser, $L_{DY}$ denotes a horizontal deflection coil, $C_S$ denotes a main correction condenser, FBT denotes a flyback transformer, and +B denotes a horizontal deflection circuit voltage.

Since the so far constituted horizontal deflection circuit is well known in the industry, detailed description of the operation thereof will be omitted, and description of the inventive adaptation will be given.

As shown in FIG. 3, the s-shaped correction condenser $C_S$ is connected in parallel with a front portion correction condenser $C_{S1}$ and a rear portion correction condenser $C_{S2}$ for changing the capacitance thereof and switches $SW_1$ and $SW_2$ for switching the condensers $C_{S1}$ and $C_{S2}$, respectively. In addition, a discharging high resistance (high resistance; not shown) is connected in parallel with the correction condensers $C_{S1}$ and $C_{S2}$. Each of the switches $SW_1$ and $SW_2$ is composed of a field effect transistor (FET) which is turned on and off in accordance with respective first and second control signals CS-$C_{TL1}$ and CS-$C_{TL2}$ generated by a timing pulse generator 11. A wave form shaping unit 12 receives a flyback pulse signal from an auxiliary winding 13 of the flyback transformer FBT and outputs a shaped signal to the timing pulse generator 11, which also receives a vertical parabola signal and a pair of control signals DA-$CT_{L1}$ and DA-$CT_{L2}$.

Figure 4A:
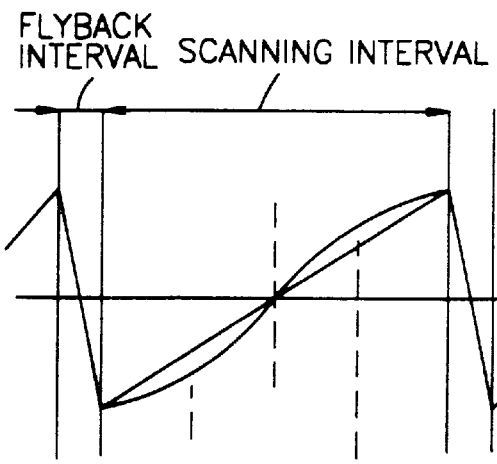
FIGS. 4A through 4C are wave form diagrams illustrating S-shaped correction signal characteristics of the circuit of FIG. 3.
Figure 4B:
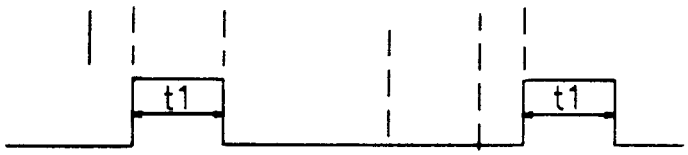
Figure 4C:

The operation of the horizontal deflection circuit shown in FIG. 3 will now be explained with reference to FIG. 4. The construction and operation of the elements related to the timing pulse generator 11 will be described later. FIG. 4A illustrates a current flowing in the deflection yoke, FIG. 4B illustrates a first control signal CS-$C_{TL1}$, and FIG. 4C illustrates a second control signal CS-$C_{TL2}$.

During the time interval t1 of the front portion of the horizontal scanning interval, the first control signal CS-$C_{TL1}$ is outputted, and the switch $SW_1$ is turned on. In a predetermined time interval t2 in the rear portion, a second control signal CSC$_{TL2}$ is outputted, whereby the switch $SW_2$ is operated. Therefore, during the time interval t1 of the front portion of the horizontal scanning interval, the correction condenser $C_S$ is connected in parallel with the front portion correction condenser $C_{S1}$. Thereafter, the front correction S-shaped condenser $C_{S1}$ is disconnected, and only the S-shaped condenser $C_S$ is connected. At the time t2 in the rear portion, the correction condenser $C_S$ is parallely connected with the rear portion correction condenser $C_{S2}$.

Figure 5:
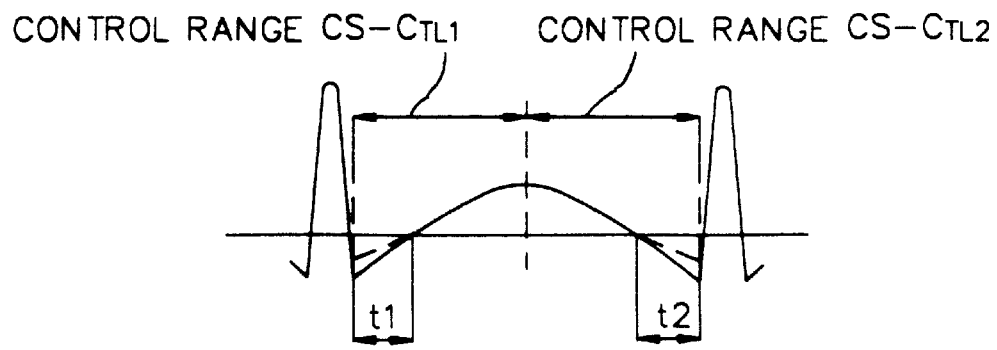
FIG. 5 is a wave form diagram illustrating a voltage applied to an S-shaped correction signal condenser of the circuit of FIG. 3.

FIG. 5 illustrates the wave form of a voltage signal applied to the S-shaped signal correction condenser $C_S$. In the present invention, in the time intervals t1 and t2, the straight line characteristic is changed to the broken line characteristic.

According to changing the straight line characteristics to the broken line characteristics in each the horizontal scanning interval, the capacitance of the S-shaped correction signal condenser is changed, and thus the oscillation frequency of the horizontal deflection signal $L_{DY}$ is changed. The characteristic of the correction condenser is changed by controlling the parallel connection of the correction $C_{S1}$ and $C_{S2}$ in the front and rear portions of the horizontal scan by controlling the time intervals of the first and second control signals CS-$C_{TL1}$, and CS-$C_{TL2}$, so that it is possible to correct the horizontal distortion of the image and obtain accuracy thereof. In particular, in the front and rear portions of the horizontal scanning interval, it is possible to implement a balanced S-shaped correction.

Turning back to the embodiment of FIG. 3, the timing pulse generator 11 receives a saw tooth wave form signal as an FBT pulse from the auxiliary winding 13 of the flyback transformer FBT passes through the wave form shaping unit 12, the vertical parabola wave signal which is used in the circuit of the cathode ray tube, and direct current control signals DA-$C_{TL1}$ and DA-$C_{TL2}$ outputted to externally connected elements such as a microcomputer, etc.

As shown in FIG. 6, the timing pulse generator 11 includes first and second direct current voltage adders 15 and 16, first and second comparators 17 and 18, and an inverting amplifier 19.

The first direct current voltage adder 15 receives the vertical parabola wave signal and first direct current control signal DA-$C_{TL1}$. The second direct current voltage adder 16 receives the vertical parabola wave signal and second control direct current signal DA-$C_{TL2}$. The comparator 17 receives the saw tooth wave form signal the polarity of which is inverted by the inverting amplifier 19 and an output signal from the first direct current voltage adder 15, respectively, and outputs the first control signal CS-$C_{TL1}$. The second comparator 18 receives the saw tooth wave form signal and an output signal from the second direct current voltage adder 16 and outputs the second control signal CS-$C_{TL2}$, respectively.

The operation of the timing pulse generator 11 will be explained with reference to FIGS. 7A–7D and 8A–8D.

In the drawings, the wave form shown in FIG. 7A corresponds to the input signals to the second comparator 18 and denotes the interrelationship between the vertical parabola wave form of one field and the saw tooth wave signal. Here, the vertical parabola wave signal is combined with the direct current control signal DA-$C_{TL2}$ by the second direct current voltage adder 16. In addition, the portion A denotes the value of the vertical parabola wave signal at the upper vertical screen position of the cathode ray tube, the portion B denotes the value of the vertical parabola wave signal at the center vertical screen position of the cathode ray tube, and the portion C denotes the value of the vertical parabola wave signal at the lower vertical screen position of the cathode ray tube.

The wave form shown in FIG. 7B is an enlarged view of the wave form shown in FIG. 7A showing one horizontal scanning period. The values at the portions A, C and B of the wave form shown in FIG. 7A correspond to the vertical parabola wave. The second comparator 18 outputs second control signal CS-$C_{TL2}$ when the value of the saw tooth wave exceeds the value of the vertical parabola wave signal. The wave form of the second control signal CS-$C_{TL2}$ is shown in FIGS. 7C and 7D and corresponds to the control signal of the rear portion of the horizontal scanning interval.

At the portion B, which is the central vertical screen position of the cathode ray tube, since the value of the vertical parabola wave signal is increased, and the interval in which the value of the saw tooth wave exceeds the value of the vertical parabola wave signal, as shown in FIG. 7C, the output period of the control signal CS-$C_{TL2}$ is shortened. In addition, at the upper vertical A and lower vertical position C of the cathode ray tube, since the value of the vertical parabola wave signal is decreased, and the interval in which the value of the saw tooth wave signal exceeds the value of the vertical parabola wave signal is decreased, as shown in FIG. 7D, the output interval of the control signal CS-$C_{TL2}$ is extended.

The wave form shown in FIG. 8A corresponds to the input signals to the first comparator 17 and denotes the interrelationship between the vertical parabola wave signal of one field and the saw tooth wave signal. Here, the saw tooth wave signal is inverted by the inverting amplifier 19, and the vertical parabola wave signal is combined with the direct current control signal DA-$C_{TL2}$ by the first direct current voltage adder 15, respectively. In the drawing, the portions A', B' and C' are the same as the portions A, B and C shown in FIG. 7A.

The wave form shown in FIG. 8B is an enlarged view of the wave form shown in FIG. 8A for one horizontal scanning period. The first comparator 17 outputs the control signal CS-$C_{TL1}$ when the value of the vertical parabola wave signal exceeds the value of the saw tooth wave signal, identically to the second comparator 18. Therefore, the output signal CS-$C_{TL1}$ as shown in FIGS. 8C and 8D becomes the control signals at the front portion of the horizontal scanning interval.

Figure 9:
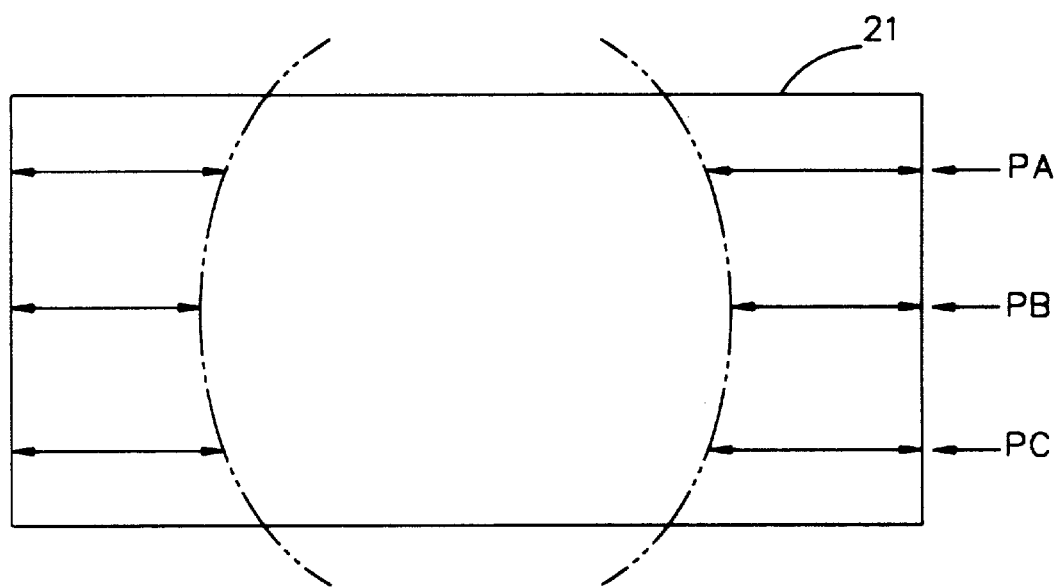
FIG. 9 is a view illustrating a cathode tube screen for explaining the effects of the circuit of FIG. 3.

FIG. 9 illustrates the effects of the variations in the pulse widths of the first and second control signals CS-$C_{TL1}$ and CS-$C_{TL2}$ during a vertical scanning period on a screen 21 of the cathode ray tube. In the drawing, the arrows denote the pulse widths of the control signals CS-$C_{TL1}$ and CS-$C_{TL2}$ during a horizontal scanning period. As shown therein, the pulse widths of the control signals are wider at the upper and lower portions A and C of the screen 21, and narrower at the central portion B of the same. The range of the non-spherical surface distortion which occurs in the left and right portions (edges) in the horizontal direction of the cathode ray tube screen is increased at the upper and lower portions (edges) of the cathode ray tube, and is more decreased toward the central portion. In addition, since the pulse widths for which the correction is performed is varied based on the range of the distortion, it is possible to implement a better correction.

Turning back to FIG. 6, the values of the direct current control signals DA-$C_{TL1}$ and DA-$C_{TL2}$ are controlled by a microcomputer, etc., as the values of the vertical parabola wave signal shown in FIGS. 7B and 8B are increased, so that the pulse widths of the control signals from the first and second comparators 17 and 18 can be varied. Therefore, the values of the first and second direct current control signals DA-$C_{TL1}$ and DA-$C_{TL2}$ are corrected, and thus the S-shape correction characteristic is adjusted.

It is possible to variously modify the present invention, the first and second switching means for varying, for example, the number of the switchable correction condensers may be changed, and the interval of their switching may be changed.

In addition, it is possible to control the correction width of the S-shape correction signal by using the direct current control signals DA-$C_{TL1}$ and DA-$C_{TL2}$. Furthermore, it is possible to adjust the horizontal scanning distortion over the vertical positions of the screen.

In the present invention, the first and second direct current voltage adders 15 and 16 may be omitted. One of the direct current control signals DA-$C_{TL1}$ and DA-$C_{TL2}$ or the vertical parabola wave signal may be inputted into the first and second comparators 17 and 18, for thus being compared with the value of the saw tooth wave signal. In addition, the signal value used for comparing with the value of the saw tooth wave signal may be a fixed value.

In the S-shaped correction signal circuit in which a correction condenser is installed in the horizontal deflection circuit, it is possible to obtain a good accuracy correction effect and to variably adjust the correction.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a horizontal scanning correction circuit for a horizontal deflection circuit of a cathode ray tube, a horizontal S-shaped correction signal circuit, comprising:

front and rear portion correction condensers parallely connected with a main correction condenser which is connected in series with a horizontal deflection coil;

a first switching means for switchably connecting the front portion correction condenser to the main correction condenser;

a second switching means for switchably connecting the rear portion correction condenser to the main correction condenser; and a control means for controlling the first and second switching means for varying a total capacitance of the correction signal circuit by turning on the first switching means in a front portion interval of a horizontal scanning period and by turning on the second switching means in a rear portion interval of the horizontal scanning period, for thus compensating a horizontal image distortion.

2. The correction circuit of claim 1, wherein said control means comprises:

a waveform shaping unit for inputting a FBT pulse and outputting a saw tooth wave signal; and a timing pulse generator for generating pulses which vary an interval of the horizontal scanning period in a vertical field interval, wherein said timing pulse generator comprises:

a first direct current voltage adder for adding the vertical parabola signal and a first control signal outputted from a microcomputer;

a second direct voltage adder for adding the vertical parabola signal and a second control signal outputted from a microcomputer;

an inverting amplifier for inverting said saw tooth wave signal and generating an inverted saw tooth wave signal;

a first comparator for generating a first pulse with a width of the portion of said inverted saw tooth wave signal above said parabola signal; and a second comparator for generating a second pulse with a width of the portion of said saw tooth wave signal above said parabola signal.

* * * * *